US009266739B2

(12) United States Patent
Yeon et al.

(10) Patent No.: US 9,266,739 B2
(45) Date of Patent: Feb. 23, 2016

(54) METHOD FOR PREPARING CARBIDE-DERIVED CARBON-BASED ANODE ACTIVE MATERIAL AND ANODE ACTIVE MATERIAL PREPARED BY THE SAME

(71) Applicant: KOREA INSTITUTE OF ENERGY RESEARCH, Daejeon (KR)

(72) Inventors: Sun-Hwa Yeon, Daejeon (KR); Kyoung-Hee Shin, Daejeon (KR); Chang-Soo Jin, Daejeon (KR); Kyu-Nam Jung, Daejeon (KR); Sukeun Yoon, Daejeon (KR); Jae-Deok Jeon, Daejeon (KR); Joonmok Shim, Daejeon (KR); Jung-Hoon Yang, Daejeon (KR); Bum-Suk Lee, Daejeon (KR); Myung Seok Jeon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 154 days.

(21) Appl. No.: 14/067,635

(22) Filed: Oct. 30, 2013

(65) Prior Publication Data

US 2014/0134494 A1 May 15, 2014

(30) Foreign Application Priority Data

Nov. 2, 2012 (KR) ........................ 10-2012-0123761

(51) Int. Cl.
*H01M 4/04* (2006.01)
*C01B 31/10* (2006.01)
*H01M 4/587* (2010.01)
*H01M 10/052* (2010.01)

(52) U.S. Cl.
CPC ............. *C01B 31/10* (2013.01); *H01M 4/0471* (2013.01); *H01M 4/587* (2013.01); *H01M 10/052* (2013.01); *Y10T 29/49108* (2015.01)

(58) Field of Classification Search
CPC ...................................................... H01M 4/0471
USPC ....................................................... 429/231.8
See application file for complete search history.

(56) References Cited

U.S. PATENT DOCUMENTS 7,048,902 B2    5/2006 Gordeev et al.
2004/0253517 A1* 12/2004 Kim et al. ................ 429/231.95

FOREIGN PATENT DOCUMENTS

KR    20010013225 A    2/2001
KR    100814817 B1     3/2008

OTHER PUBLICATIONS

Osswald et al.: "Porosity Control in Nanoporous Carbide-Derived Carbon by Oxidation in Air and Carbon Dioxide", Journal of Solid State Chemistry, vol. 182, (2009), pp. 1733, 1741.

*Primary Examiner* — Basia Ridley
*Assistant Examiner* — James Erwin
(74) *Attorney, Agent, or Firm* — Westman, Champlin & Koehler, P.A.; Amanda M. Prose

(57) ABSTRACT

Disclosed is a method for preparing a carbide-derived carbon-based anode active material. The method includes preparing carbide-derived carbon, and expanding pores of the carbide-derived carbon. Here, expanding pores is performed as an activation process of heating the prepared carbide-derived carbon in the air. The pores formed inside the carbide-derived carbon can be expanded during the activation process in the preparation of the carbide-derived carbon-based anode active material. In addition, by applying the carbide-derived carbon to an anode active material, lithium secondary battery having improved charge-discharge efficiency can be prepared.

4 Claims, 6 Drawing Sheets

1 Flowmeters
2 Resistance furnace
3 Quartz reaction tube
4 Quartz boat with sample
5 Sulfuric acid Cl₂
HCl Ar

METHOD FOR PREPARING CARBIDE-DERIVED CARBON-BASED ANODE ACTIVE MATERIAL AND ANODE ACTIVE MATERIAL PREPARED BY THE SAME

CROSS-REFERENCE TO RELATED APPLICATIONS

This application claims the benefit of Korean Patent Application No. 10-2012-0123761, filed with the Korean Intellectual Property Office on Nov. 2, 2012, the disclosure of which is incorporated herein by reference in its entirety.

BACKGROUND

The present invention relates to a method for preparing an anode active material of a lithium secondary battery and an anode active material prepared by the same, and more particularly, to a method for preparing an anode active material based on carbide-derived carbon having pores therein and an anode active material prepared by the same.

Generally, carbon is classified into amorphous carbon, graphite, diamond, fullerene-like structures, nanotubes, and the like depending on properties thereof, and carbon having specific structures and properties can be created by varying reaction conditions. Graphite requires high temperature conditions and carbon atoms of graphite exhibit extremely low mobility. Diamond requires difficult reaction conditions based on high pressure or high-energy activation technology. Recently, with the development of nano-techniques, demand for techniques capable of controlling growth of atomic-level carbon materials has been increasing.

Carbon is mainly used as an anode material for secondary batteries, particularly, lithium secondary batteries. More particularly, hard carbon, which is non-graphite carbon, or graphitized soft carbon is mainly used as the anode material.

Graphite constituting a $LiC_6$ structure has a theoretical capacity of 380 mAh/g based on a charge-discharge reaction mechanism of secondary batteries, and carbonized materials having a structure beyond such theoretical capacity based on the charge-discharge reaction mechanism have been developed in the art.

Carbide-derived carbon (CDC) is a carbon material prepared by selectively removing metal atoms from crystalline metal carbide, which is a compound of metal and carbon and has a highly crystalline structure, and nano-sized pores are formed at positions from which metal atoms are removed (Korean Patent Application Publication No. 10-2001-0013225 A).

The carbide-derived carbon allows efficient supply and discharge of reactants and by-products through the nano-sized pores, and has a large surface area. Therefore, efforts to use the carbide-derived carbon as an energy reservoir are ongoing, and although technology to apply the carbide-derived carbon to an anode material for secondary batteries has been developed (Korean Patent No. 10-0814817), the technology in the art has insufficient efficiency.

The present invention solves these problems, as well as others.

SUMMARY OF THE INVENTION

Provided herein are systems and methods for preparing a carbide-derived carbon-based anode active material that comprise preparing carbide-derived carbon; and expanding pores of the carbide-derived carbon.

The methods, systems, and compositions are set forth in part in the description which follows, and in part will be obvious from the description, or can be learned by practice of the methods, apparatuses, and systems. The advantages of the methods, systems, and compositions will be realized and attained by means of the elements and combinations particularly pointed out in the appended claims. It is to be understood that both the foregoing general description and the following detailed description are exemplary and explanatory only and are not restrictive of the methods, systems, and compositions, as claimed.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION OF THE INVENTION

Figure 1:
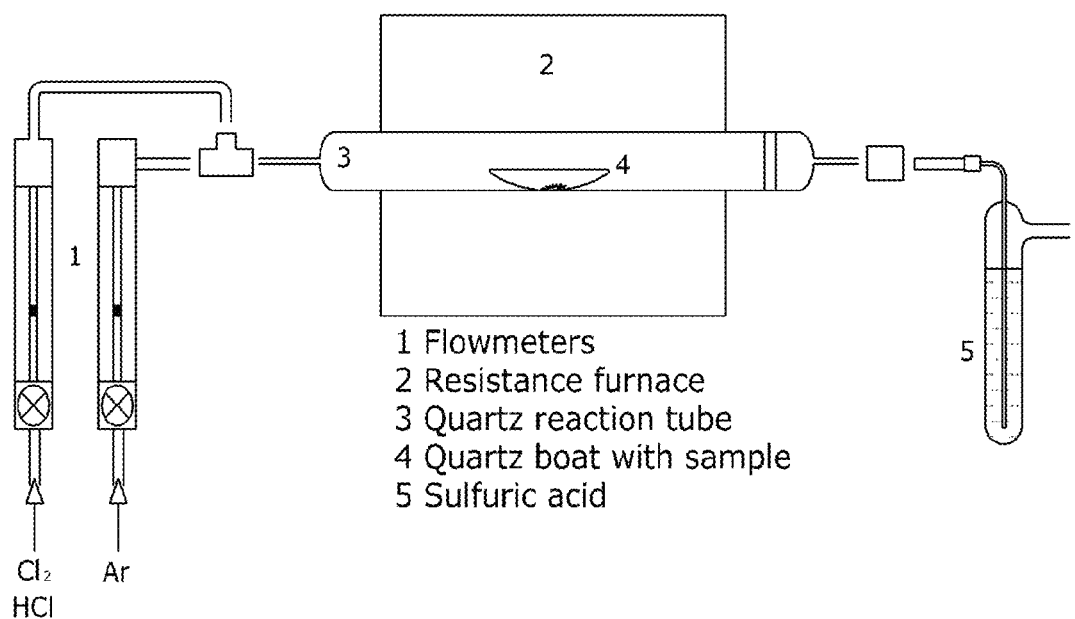
FIG. 1 shows equipment used for preparing carbide-derived carbon in one inventive example.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Generally speaking, a method for preparing a carbide-derived carbon-based anode active material is disclosed having improved charge-discharge efficiency by expanding pores formed inside carbide-derived carbon.

In accordance with one aspect of the present invention, a method for preparing a carbide-derived carbon-based anode active material includes: preparing carbide-derived carbon; and expanding pores of the carbide-derived carbon.

An anode active material is capable of improving efficiency of lithium secondary batteries by adding operation of expanding pores formed inside the carbide-derived carbon to facilitate supply of reactants and discharge of by-products.

Here, expansion of the pores is advantageously performed as an activation process of heating the prepared carbide-derived carbon in air, and the activation process may be performed at a heating temperature ranging from about 500° C. to about 900° C.

A method for expanding pores formed inside the carbide-derived carbon through the activation process of heating the prepared carbide-derived carbon in air.

In addition, the preparation of carbide-derived carbon is advantageously performed by etching remaining elements excluding carbon in a carbide precursor through thermochemical reaction of the carbide precursor with a halogen group element-containing gas at a temperature from about 200° C. to about 1200° C. Here, the halogen group element-containing gas may include at least one selected from among $Cl_2$, $I_2$, and $F_2$.

In accordance with another aspect of the present invention, there is provided a method for preparing a lithium secondary battery including: a cathode including a lithium-based cathode active material; an anode including a carbide-derived carbon-based anode active material; and an electrolyte, wherein the anode active material is prepared by the method for preparing a carbide-derived carbon-based anode active material.

In one embodiment, the carbide-derived carbon-based anode active material is prepared by the above method.

In another embodiment, the carbide-derived carbon-based anode active material is used for an anode of a lithium secondary battery, and an average size of pores formed therein ranges from about 1.5 nm to about 3 nm.

Here, a volume of Barrett-Joyner-Halenda (BJH) pores having a size of about 1.7 nm or more among the pores formed inside the carbide-derived carbon-based anode active material is advantageously about 70% or more of a total pore volume.

In accordance with a further aspect of the present invention, a lithium secondary battery includes: a cathode including a lithium-based cathode active material; an anode including a carbide-derived carbon-based anode active material; and an electrolyte, wherein an average size of pores formed inside the carbide-derived carbon-based anode active material ranges from about 1.5 nm to about 3 nm.

Here, it is advantageous that a volume of BJH pores having a size of about 1.7 nm or more among the pores formed inside the carbide-derived carbon-based anode active material is about 70% or more of the total pore volume.

As described above, according to embodiments of the invention, pores formed inside carbide-derived carbon may expand during an activation process in preparation of a carbide-derived carbon-based anode active material.

In addition, by applying the carbide-derived carbon having expanded pores to an anode active material, it is possible to manufacture a lithium secondary battery having improved charge-discharge efficiency.

In one example, in order to selectively remove metal atoms from crystalline metal carbide, a process of etching metal using a halogen element-containing reaction gas was performed. When reaction gas reacts with the crystalline metal carbide at about 200° C. to about 1200° C., metal elements react with the reaction gas to form a gaseous compound and are removed, and only solid carbon remains.

FIG. 1 shows equipment used for preparing carbide-derived carbon in this example.

A flow meter 1 is disposed at a position at which a gas flows, to controls flow rates of inert Ar gas and reaction gases. A quartz reaction tube 3 is disposed inside an electric resistance furnace 2, and a quartz boat 4 receiving reactants therein is disposed inside the quartz reaction tube 3. After reaction, the reaction gases are discharged through sulfuric acid 5.

In this example, about 2 g of carbide was placed in the quartz boat 4, which in turn was placed in the middle of the quartz reaction tube 3. Then, the quartz reaction tube 3 was sealed with a U-shaped tube and $Cl_2$ gas was introduced into the tube. Next, with the electrical resistance furnace 2 set to about 1200° C., reaction was carried out for about 3 hours to etch metal atoms from the carbide.

Then, in order to remove $Cl_2$ gas or by-products remaining on a surface of carbon, annealing was performed using $H_2$ gas for about 2 hours to improve purity of carbon.

Finally, in order to expand pores in prepared carbide-derived carbon, the carbide-derived carbon was exposed to air, and an activation process was performed at 550° C. for about 4 hours.

In order to confirm an effect of the activation process, surface areas and pores of the carbide-derived carbon not subjected to the activation process in a comparative example and the carbide-derived carbon subjected to the activation process in the inventive example were measured, and results are shown in Table 1.

TABLE 1

| | BET SSA ($m^2/g$) | BET total pore volume ($cm^3/g$) | BJH pore volume ($cm^3/g$) | MP pore volume ($cm^3/g$) | Average pore size (nm) |
|---|---|---|---|---|---|
| Inventive example | 1080 | 0.81 | 0.58 | 0.63 | 2.98 |
| Comparative example | 1000 | 0.69 | 0.39 | 0.64 | 1.25 |

As shown in Table 1, it can be confirmed that the carbide-derived carbon subjected to the activation process in the inventive example had a larger specific surface area (SSA) measured by BET method than the carbide-derived carbon not subjected to the activation process in the comparative example. This result is thought to be caused by expansion of the pores, and can be also seen from the measured results of the pores.

As measured by the BET method, a sample subjected to the activation process in the inventive example had a total pore volume of 0.81 $cm^3/g$, which is greater than 0.69 $cm^3/g$ of a sample prepared in the comparative example.

Depending on pore sizes, the volume of micropores (MP) having a size from 0.42 nm to 2 nm in the inventive example was slightly decreased to 0.63 $cm^3/g$ as compared with 0.64 $cm^3/g$ in the comparative example, whereas the volume of Barrett-Joyner-Halenda (BJH) pores having a size of 1.7 nm or more was increased to 0.58 $cm^3/g$, which was 72% the total pore volume, in the inventive example, as compared with 0.39 $cm^3/g$, which was 57% the total pore volume in the comparative example. That is, a proportion of large-sized pores was increased in the inventive example. As a result, although an average pore size of the sample not subjected to the activation process in the comparative example was 1.25 nm, average pore size of the sample in the inventive example was significantly increased to 2.98 nm.

Figure 2:
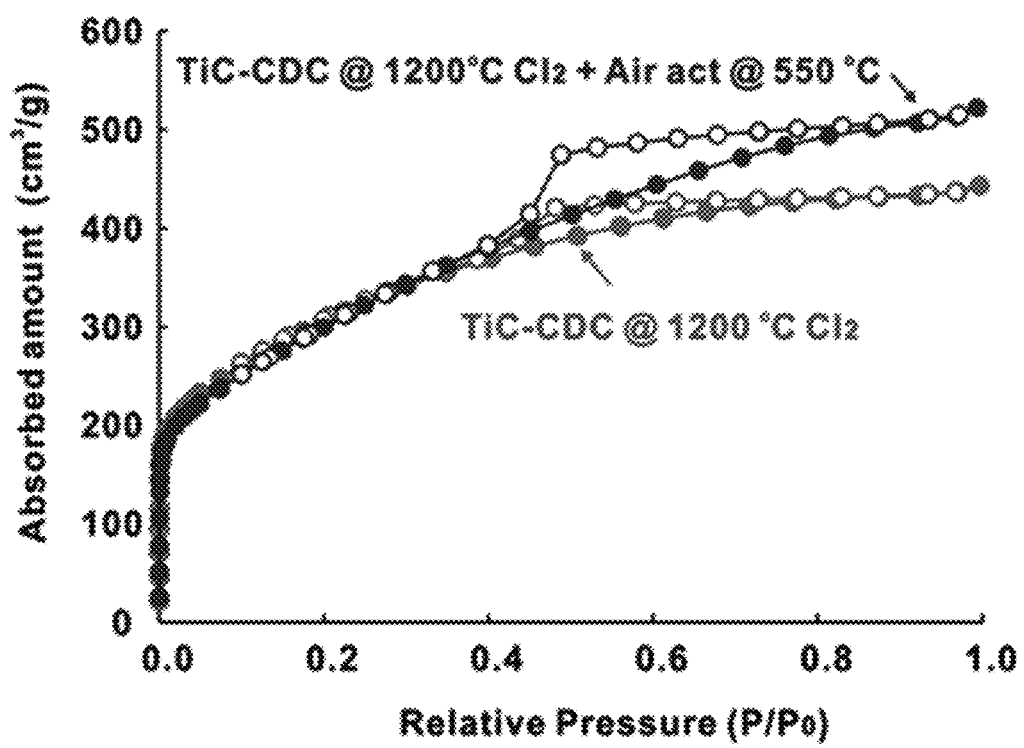
FIG. 2 shows N2 absorption curves of carbide-derived carbon prepared in inventive and comparative examples.

FIG. 2 shows $N_2$ absorption curves of carbide-derived carbon prepared in the inventive and comparative examples. An upper curve corresponds to the carbide-derived carbon subjected to the activation process at 550° C. in the inventive example, and a lower curve corresponds to the carbide-derived carbon not subjected to the activation process in the comparative example.

As shown, it can be seen that when a relative pressure value is greater than or equal to 0.4, a total absorbed amount of the carbide-derived carbon according to the inventive example is high.

Figure 3:
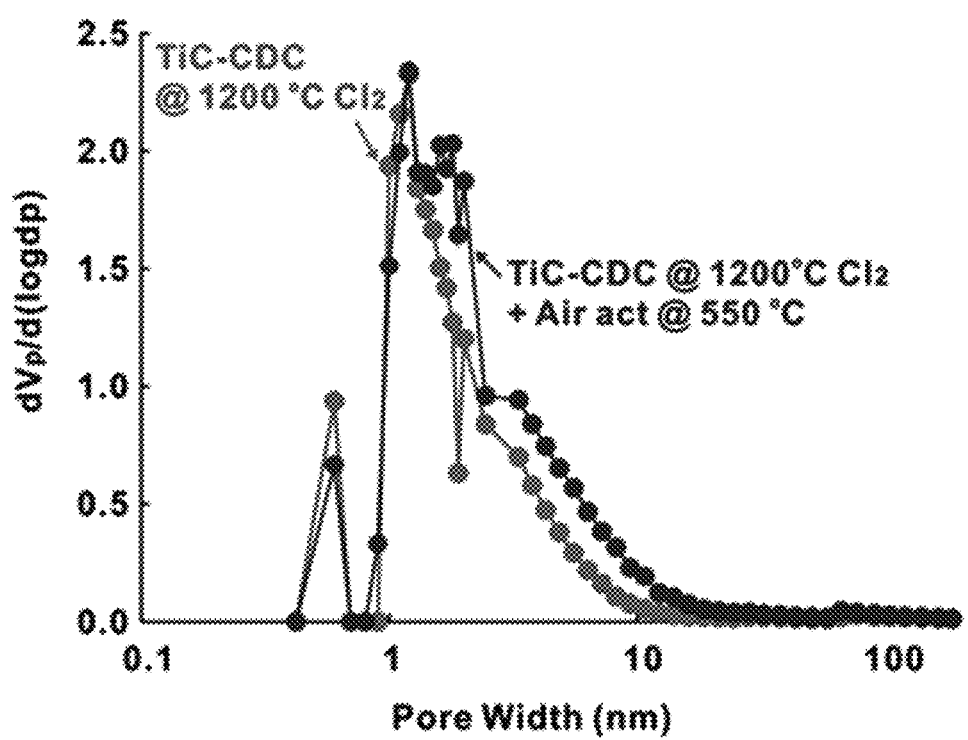
FIG. 3 is a graph depicting pore distribution of carbide-derived carbon prepared in the inventive and comparative examples.

FIG. 3 is graphs depicting pore distribution of carbide-derived carbon prepared in the inventive and comparative examples.

As shown in FIG. 3, it can be confirmed that, although the carbide-derived carbon of the comparative example displayed in the left has a more number of pores having a size below 2 nm, the carbide-derived carbon of the inventive example displayed in the right has a more number of pores having a size of 2 nm or more.

Figure 4:
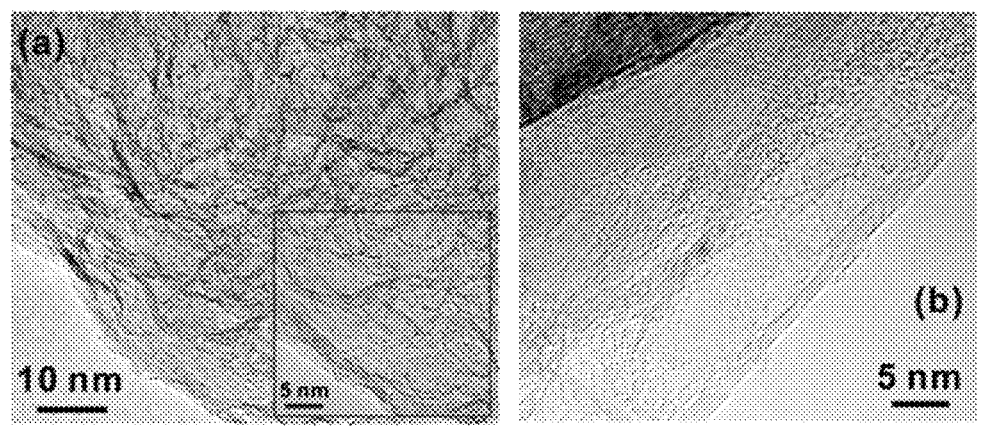
FIG. 4 shows transmission electron micrographs of pores of carbide-derived carbon.

FIG. 4 shows transmission electron micrographs to confirm pores of carbide-derived carbon. FIG. 4(a) is an image of the carbide-derived carbon not subjected to the activation process in the comparative example, and FIG. 4(b) is an image of the carbide-derived carbon subjected to the activation process in the inventive example.

The carbide-derived carbon prepared in the comparative example has a structure in which an amorphous phase distributed throughout the structure is mixed with graphite fringes surrounding the amorphous phase. On the contrary, the carbide-derived carbon prepared in the inventive example has a structure in which the amorphous phase and the graphite fringes are mixed and pores therein expand.

Next, for charge-discharge testing of lithium secondary batteries prepared using the carbide-derived carbon of the inventive and comparative examples, lithium secondary batteries were prepared.

First, a process of preparing an anode will be described.

The carbide-derived carbon prepared in the inventive and comparative examples was used as an anode active material, super-P carbon was used as a conductive agent, and a mixture of 40 wt % of a styrene butadiene rubber aqueous solution and sodium carboxymethyl cellulose and 60 wt % of a polytetrafluoroethylene (PTFE) aqueous solution was used as a binding agent.

These materials were mixed in a weight ratio of 80 wt % of the anode active material, 13 wt % of the conductive agent and 7 wt % of the binding agent, and stirred at a high speed of about 2000 rpm for 30 minutes using a homogenizer, thereby preparing slurries. The prepared slurries were coated onto a 10 μm thick copper plate using a doctor blade, and dried at 80° C. for 24 hours. Then, the copper plate was cut to a size of 3 cm×4 cm and subjected to rolling, followed by drying at 80° C. for 24 hours in a vacuum oven, thereby preparing an anode plate.

Next, a lithium secondary battery was prepared by the following method.

First, a lithium metal electrode having the same size as the anode prepared by the above method was used as a cathode; a solution prepared by mixing ethylene carbonate containing 1 M $LiPF_6$ dissolved therein with diethylcarbonate (DEC) in a weight ratio of 1:1 was used as an electrolyte; and Celgard2400 was used as a separator. These materials were assembled as a coin cell in a glove box.

Charge-discharge testing of the lithium secondary batteries prepared using the carbide-derived carbon according to the inventive and comparative examples were performed using a Series 4000 battery tester (Maccor Co., Ltd.). During charge-discharge testing, in a potential range from an open circuit voltage to 0.005 V (vs. Li/Li+), discharge was carried out in a constant current and then, in a potential range from 2.8 V to 0.005 V (vs. Li/Li+), the charge-discharge testing was carried out to C-rate of 0.1 C.

Figure 5:
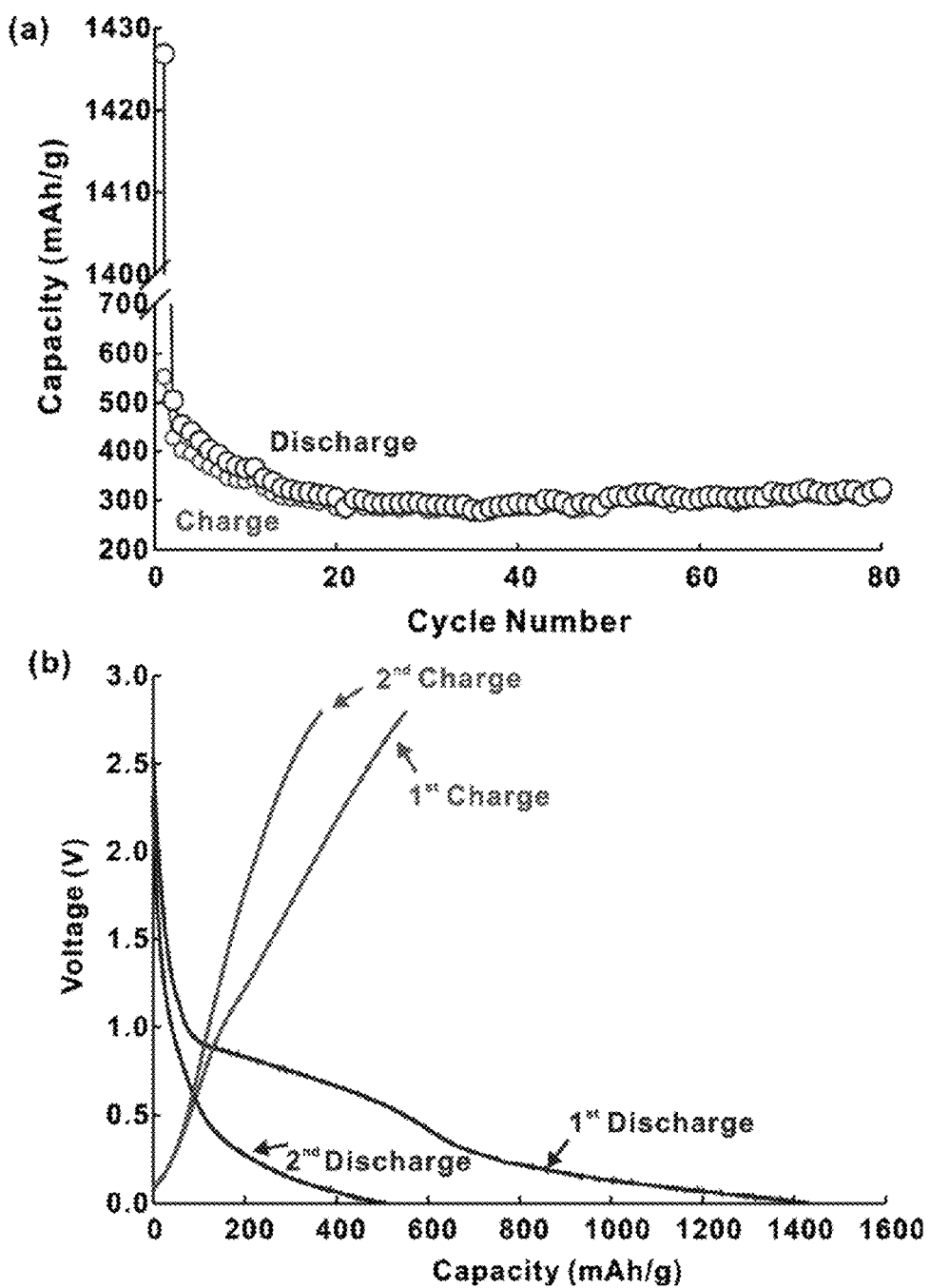
FIG. 5 shows results of charge-discharge testing of a lithium secondary battery prepared using carbide-derived carbon according to the comparative example.
Figure 6:
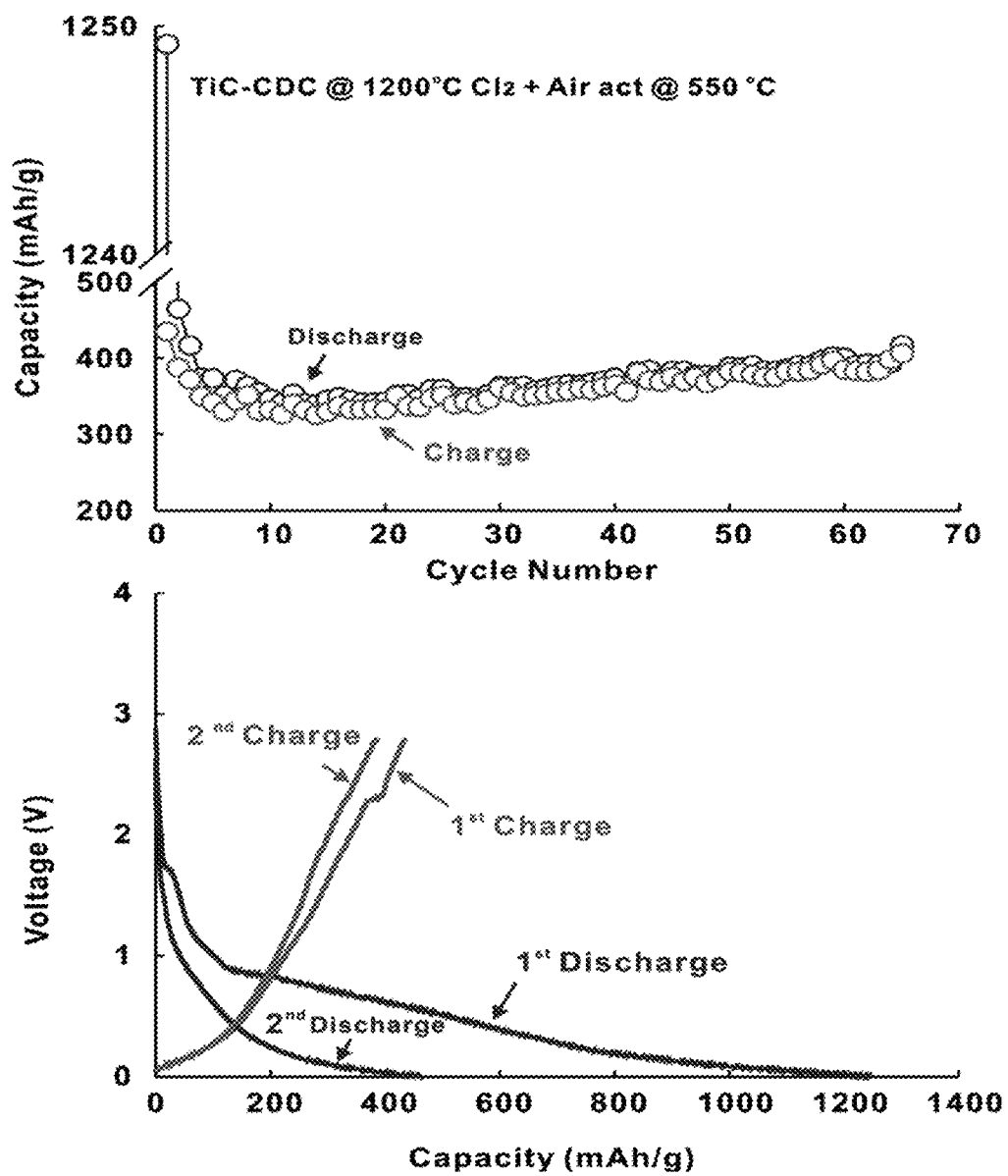
FIG. 6 shows results of charge-discharge testing of a lithium secondary battery prepared using carbide-derived carbon according to the inventive example.

FIG. 5 shows results of charge-discharge testing of a lithium secondary battery prepared using the carbide-derived carbon according to the comparative example, and FIG. 6 shows results of charge-discharge testing of a lithium secondary battery prepared using the carbide-derived carbon according to the inventive example.

As shown in FIG. 5, the lithium secondary battery prepared using the carbide-derived carbon according to the comparative example exhibited an irreversible capacity of about 1300 mAh/g at a first cycle, exhibited an irreversible capacity of about 365 mAh/g at a 10th cycle, exhibited an irreversible capacity of about 300 mAh/g after a 40th cycle, and exhibited an irreversible capacity of about 310 mAh/g at a 80th cycle.

On the contrary, as shown in FIG. 6, the lithium secondary battery prepared using the carbide-derived carbon according to the inventive example started with an initial irreversible capacity of 1250 mAh/g, exhibited an irreversible capacity of 360 mAh/g at a 10th cycle, and exhibited an irreversible capacity of 370 mAh/g at a 40th cycle, which is similar to a theoretical capacity of graphite of 372 mAh/g. In addition, the capacity of the lithium secondary battery showed a tendency of gradually increasing instead of decrease even after the 40th cycle, and the lithium secondary battery according to the inventive example exhibited a capacity of about 410 mAh/g exceeding theoretical capacity at a 70th cycle. As such, the lithium secondary battery according to the inventive example had significantly improved charge-discharge capacity as compared with the lithium secondary battery according to the comparative example.

From the results of charge-discharge testing, it could be confirmed that the lithium secondary battery including the anode prepared from the carbide-derived carbon of the inventive example had improved charge-discharge efficiency as compared with the lithium secondary battery including the anode prepared from typical carbide-derived carbon.

The reason behind such improvement of the charge-discharge efficiency is thought to be that, as the pores expand in the activation process, the amount of lithium which moves into the pores of carbide-derived carbon is increased upon electrochemical charge-discharge.

As such, by adding the activation process in the preparation of the carbide-derived carbon in the inventive example, the pores formed inside the carbide-derived carbon could expand. In addition, by applying the carbide-derived carbon, the pores of which expanded, to the anode active material, the lithium secondary battery having improved charge-discharge efficiency could be prepared.

Although some embodiments have been provided to illustrate the present invention, it should be understood that these embodiments are given by way of illustration only, and that various modifications, variations, and alterations can be made without departing from the spirit and scope of the present invention. The scope of the present invention should be limited only by the accompanying claims and equivalents thereof.

What is claimed is:

1. A method for preparing a carbide-derived carbon-based anode active material comprising:
    preparing carbide-derived carbon for anode active material by reacting a carbide precursor with a gas at a temperature higher than 1000° C. and lower than or equal to 1200° C.; and
    expanding pores size within the carbide-derived carbon by heating the carbide-derived carbon in air at a temperature ranging from 500° C. to 900° C. for activating the carbide-derived carbon to an anode active material.

2. The method according to claim 1, wherein the preparing carbide-derived carbon is performed by etching of remaining elements excluding carbon in the carbide precursor through thermochemical reaction of the carbide precursor with the gas, wherein the gas is a halogen group element-containing gas.

3. The method according to claim 2, wherein the halogen group element-containing gas comprises at least one selected from among $Cl_2$, $I_2$, and $F_2$.

4. A method for preparing a lithium secondary battery, the lithium secondary battery comprising a cathode comprising a lithium-based cathode active material; an anode comprising a carbide-derived carbon-based anode active material; and an electrolyte, the anode active material being prepared by the method according to claim 1.

* * * * *